United States Patent [19]

Ostrand

[11] Patent Number: 5,292,145
[45] Date of Patent: Mar. 8, 1994

[54] BOAT TRAILER

[76] Inventor: Dale Ostrand, 65 Dorothy Street, Thunder Bay, Ontario, Canada, P7A 5Z6

[21] Appl. No.: 893,055

[22] Filed: Jun. 3, 1992

[51] Int. Cl.$^5$ .............................................. B60P 3/10
[52] U.S. Cl. .................................. 280/414.1; 280/475
[58] Field of Search ................... 280/414.1, 475, 303, 280/301

[56] References Cited

U.S. PATENT DOCUMENTS

| | | | |
|---|---|---|---|
| 3,146,002 | 8/1964 | Faber | 280/475 |
| 3,348,860 | 10/1967 | Buckles | 280/475 |
| 3,627,352 | 12/1971 | Canole | 280/475 |
| 3,768,677 | 10/1973 | Moss | 280/414.1 |
| 3,791,676 | 2/1974 | Spratlen | 280/475 |
| 4,063,750 | 12/1977 | Mutchler | 280/475 |
| 4,319,862 | 3/1982 | Cook | 280/414.1 |
| 4,469,348 | 9/1984 | Crook | 280/475 |
| 4,530,634 | 7/1985 | Johnson | 280/414.1 |
| 4,934,895 | 6/1990 | Thibodeaux | 280/414.1 |
| 5,067,746 | 11/1991 | Baker | 280/475 |
| 5,152,657 | 10/1992 | Kehne | 280/414.1 |

Primary Examiner—Margaret A. Focarino
Assistant Examiner—Kevin Hurley
Attorney, Agent, or Firm—Adrian D. Battison; Stanley G. Ade; Murray E. Thrift

[57] ABSTRACT

A boat trailer comprises a rectangular rear frame section and a forwardly extending hitch bar. On the rear frame section is mounted a pair of longitudinally extending bunks onto which the boat can rest during transportation to avoid pressure points. Inside the bunks toward a longitudinal center line of the trailer are provided two pairs of roller assemblies which can be raised to a position to hold the boat above the bunks for loading and unloading and can be lowered to a position in which the boat is lowered onto the bunks and separated from the rollers to avoid pressure points during transportation. The roller assemblies are commonly actuated by a linear actuator arrangement at the front of the hitch bar. Each roller assembly includes four rollers independently pivotal to allow the rollers to follow the contour of the boat. At a forward end of the hitch bar is mounted a security leg which can extend along the underside of the hitch bar or can be moved downwardly to a deployed position in which it raises the hitch bar above the normal hitch position so as to incline the trailer rearwardly and can be locked in that position to prevent the hitch being used.

10 Claims, 6 Drawing Sheets

BOAT TRAILER

BACKGROUND OF THE INVENTION

This invention relates to a boat trailer for transportation of boats.

Many boat trailers have been proposed and manufactured previously. Examples are shown in U.S. Pat. Nos. 4,529,217 (Wood); 4,895,387 (Hawkins); 4,858,943 (Cote); 4,781,392 (Cooper); 4,754,988 (Hofgren) and 4,623,161 (Sprague). Many of the above patents show an arrangement of trailer which supports the boat on the trailer frame by bunks which comprise elongate beams extending longitudinally of the boat with a relatively large upper surface which is often covered with a resilient material to provide support for the boat during transportation while avoiding high stress points which can damage the surface of the boat.

Many boat owners prefer to transport their boat on a trailer of this type including bunks in order to avoid damage to the boat surface. There is however a significant problem in unloading the boat from a trailer of this type in that the boat is relatively heavy and does not slide effectively on the bunks.

Some of the above patents show rollers on which the boat can roll. Other trailer types comprise simply rollers for supporting the boat which of course enables simple rolling of the boat across the rollers into the loaded position. However the rollers tend to damage the surface of the boat during transportation in that they provide relatively high stress points in view of the very small area of contact.

A further problem which arises in relation to boat trailers is that of theft since the unit is usually parked unattended in a yard or driveway when not being used. In addition the boat trailer generally does not include any support structure at the forward end so that when left by the vehicle it is simply inclined forwardly and downwardly toward the ground. This can cause water to collect in the boat at the forward end which makes it very difficult to lift the trailer when it is required to be connected to the hitch.

Various forms of jack arrangement are provided in the prior art and examples are shown in the U.S. Pat. Nos. 2,865,658 (Dubuque); 3,841,663 (Proffit); 3,989,276 (Hamerl); 4,619,463 (Weaver); 3,791,676 (Spratlen) and 4,469,348 (Crook). The last of these patents discloses a device which comprises a spare wheel support on which is attached a loop type structure pivotal from a rearward retracted position lying along the underside of the hitch to a forward deployed position in which it extends downwardly into contact with the ground. The loop type support can be locked in the forward position. This device is however relatively complicated and has a number of disadvantages.

SUMMARY OF THE INVENTION

It is a first object of the present invention, therefore, to provide an improved boat trailer which enables the boat to be transported without danger of damage to the boat surface at pressure points and at the same time to allow the boat to be loaded and unloaded with relative ease.

It is a further object of the present invention to provide a security arrangement which allows the forward end of the trailer to be maintained in a raised position during storage which is of a simple and economic construction and effectively carries out its intended purpose.

According to the first aspect of the invention there is provided a boat trailer comprising a trailer frame, hitch bar attached to the frame and extending forwardly therefrom, a ground wheel and suspension assembly attached to the frame for support thereof in movement across the ground, and support means for supporting a boat on the trailer frame for transportation and for loading onto and unloading from the trailer frame, the support means comprising bunk means comprising at least two longitudinally extending support beams each having an upwardly facing surface for engaging the boat along a length thereof for providing a relatively large support area in engagement with the boat for transportation of the boat without stress points against the surface of the boat and a plurality of roller means mounted at spaced positions across the trailer frame for engaging the boat for rolling on the roller means during loading and unloading, said plurality of roller means being raisable and lowerable to vary the relative height thereof such that the bunk means can engage the boat during transportation and the roller means can lift the boat away from engagement with the bunk means during loading and unloading.

According to a second aspect of the invention there is provided a boat trailer comprising a trailer frame, hitch bar attached to the frame and extending forwardly therefrom, a ground wheel and suspension assembly attached to the frame for support thereof in movement across the ground, and support means for supporting a boat on the trailer frame for transportation and for loading onto and unloading from the trailer frame, and a security leg system mounted on the hitch bar comprising a single elongate strut, bracket means mounting one end of the strut on the hitch bar for pivotal movement about an axis transverse to the hitch bar from a first position lying along an underside of the hitch bar to a second position extending substantially vertically downwardly from the hitch bar, a ground engaging foot on an opposed end of the strut for resting upon the ground in the second position of the strut to support the forward end of the hitch bar raised from the ground, the length of the strut being such that the forward end of the hitch bar is raised above a normal hitch height, and means for locking the strut in the second position.

One or more embodiments of the invention will now be described in conjunction with the accompanying drawings.

DETAILED DESCRIPTION

Figure 1:
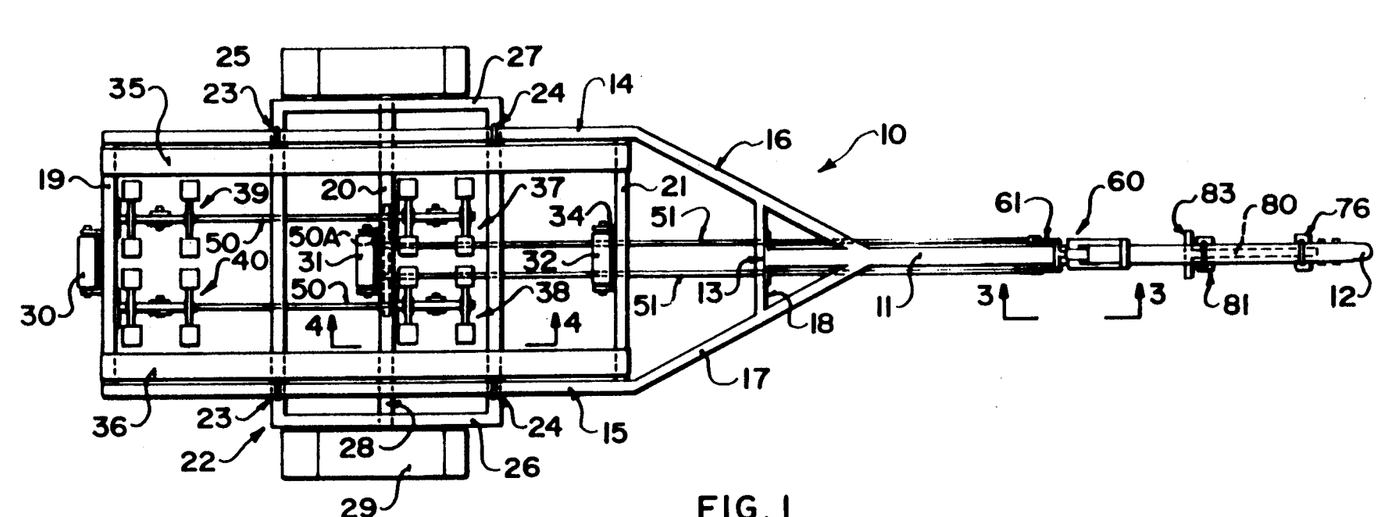
FIG. 1 is a top plan view of a boat trailer according to the present invention.
Figure 2:
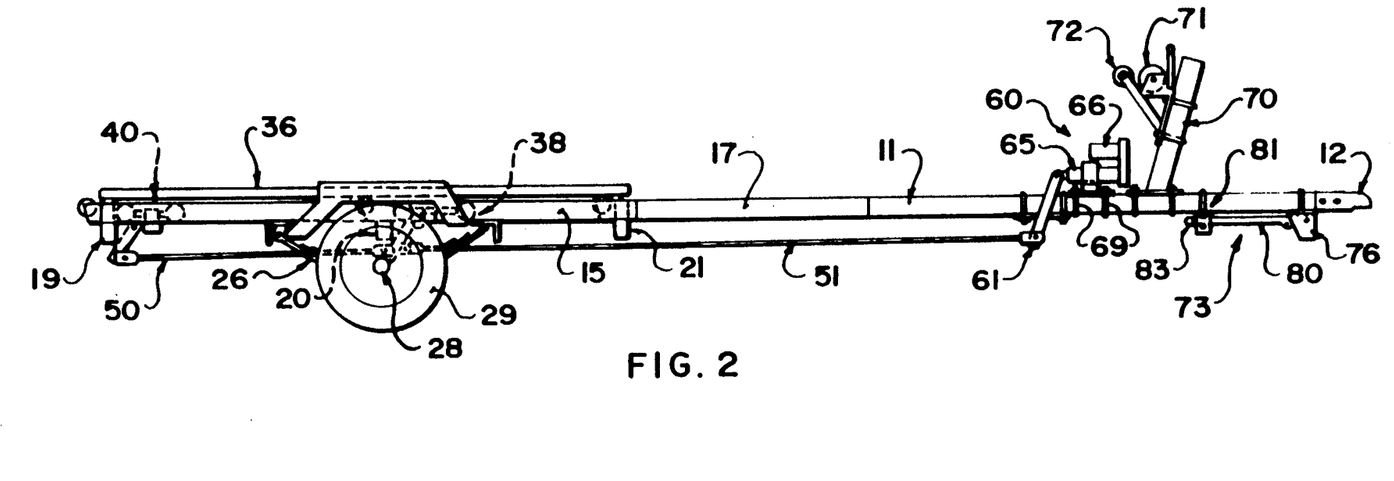
FIG. 2 is a side elevational view of the boat trailer of FIG. 1.

The boat trailer as shown in FIGS. 1 and 2 comprises generally a main trailer frame indicated at 10 which includes a longitudinal hitch bar 11 extending from a hitch coupling 12 at a forward end to a rearward end 13. The frame 10 further includes a pair of side rails 14 and 15 which lie parallel to the hitch bar 11 and spaced on either side thereof. The forward end of the side rails 14 and 15 connect to inwardly inclined coupling rails 16 and 17 which extend from the forward end inwardly toward the hitch bar 11 at a position spaced just forwardly of its rearward end 13. The rails 16 and 17 have a transverse rail 18 connected thereacross at the end 13 of the hitch bar so that the rails are connected in a triangular arrangement on the sides of the hitch bar and by the transverse rail at the rear of the hitch bar.

The side rails 14 and 15 are connected by three transverse beams 19, 20 and 21 at the rearward end, centre and forward end respectively of those rails. The side rails and the cross beams thus form a rigid rectangular structure. Underneath this rectangular structure is mounted a ground wheel support assembly which includes a separate rectangular sub frame 22 which is connected to the main frame by U-bolts 23 and 24. Leaf springs 26 and 27 are attached beneath the sides of the sub frame. The leaf springs are connected to a transverse axle 28 on which are mounted two ground wheels 29 and 30. The trailer frame and the suspension and ground wheel system therefore can be moved across the ground when towed by the hitch coupling 12.

On top of the trailer frame is mounted a support system for a boat. The support system comprises three keel support rollers, 30, 31 and 32 each mounted on a respective bracket 34 bolted to a respective one of the transverse members 19, 20 and 21. The bracket includes a pair of upstanding side walls which receive a central axle of the roller to allow the roller to rotate about an axis parallel to the respective cross beam so as to support the keel of the boat away from the cross beam and to allow rolling movement along the length of the trailer.

In addition the support system includes a pair of bunks 35 and 36 each of which comprises a longitudinal panel or beam extending along the full length of the rectangular section of the trailer and connected again onto the cross beams 19, 20, and 21. Each of the bunks is of generally conventional construction including a resilient layer thereon for engaging the side of the boat so that the upper surface of the bunk provides a relatively large surface area for engaging the side of the boat to hold the boat on the trailer while providing relatively large surface area in engagement with the boat to prevent excess pressure at individual points.

Furthermore the support system includes two pairs of roller elements 37, 38, 39 and 40. The pair 37 and 38 are arranged approximately at a midpoint of the frame and are carried upon the cross beam 20. The rear pair 39 and 40 is arranged adjacent the rear of the frame and are mounted upon and supported by the cross beam 19. Two of the roller arrangements are mounted on one side of the centre line and two roller arrangements are mounted on the opposed side of the centre line so as to engage respective sides of the boat.

Figure 4:
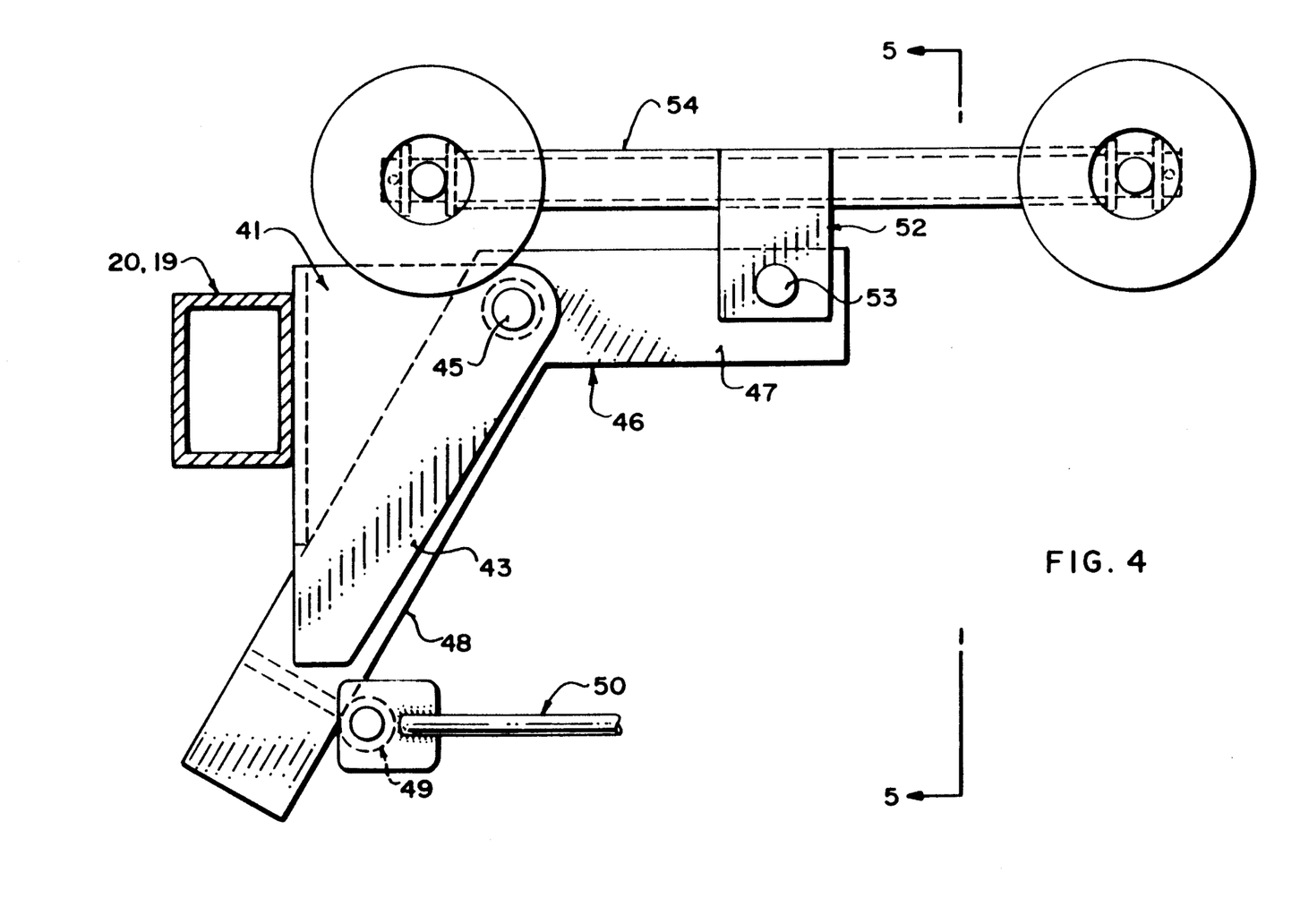
FIG. 4 is a cross sectional view of one of the roller assemblies of FIG. 1 taken along the lines 4—4 of FIG. 1.
Figure 5:
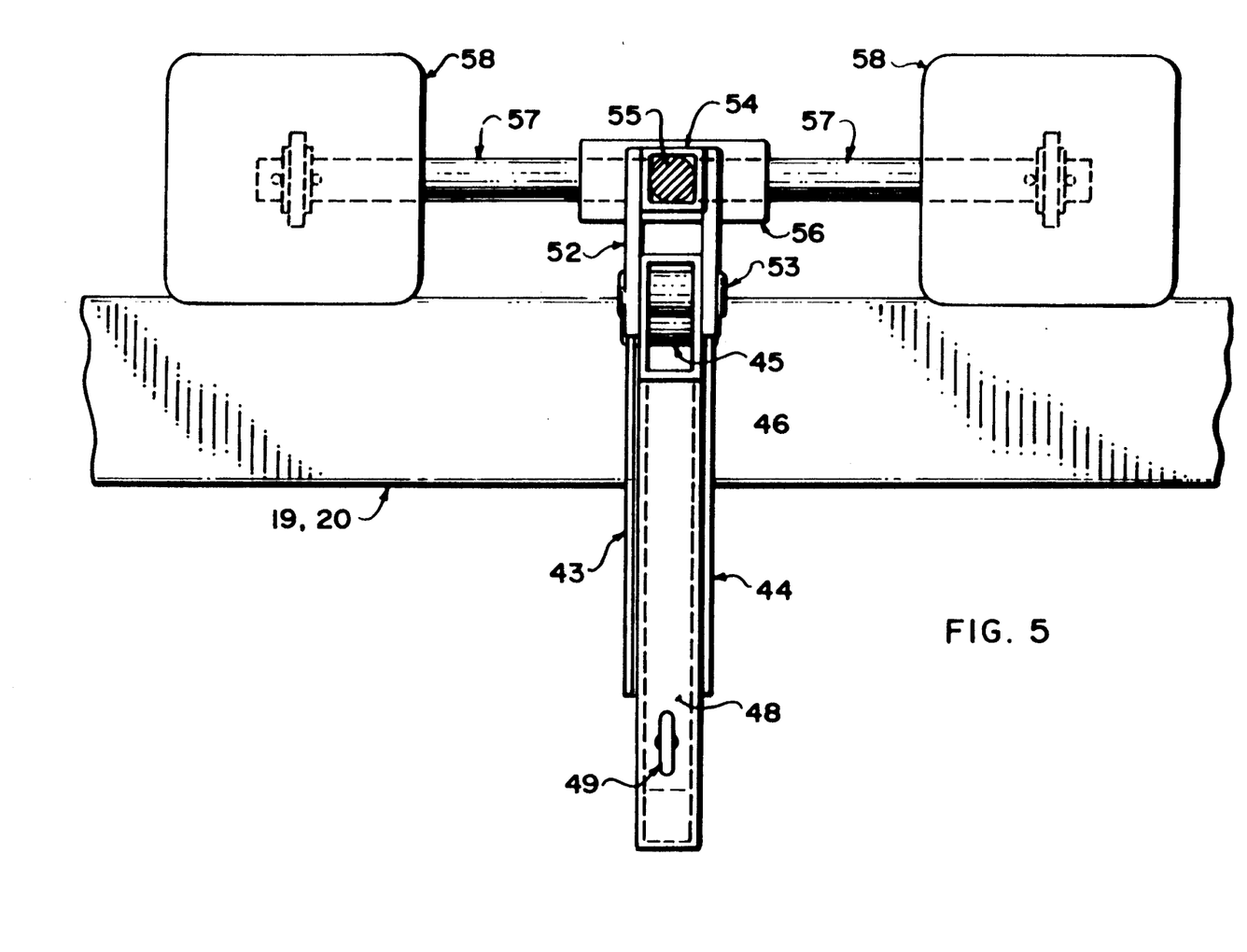
FIG. 5 is a cross sectional view taken along the lines 5—5 of FIG. 4.
Figure 6:
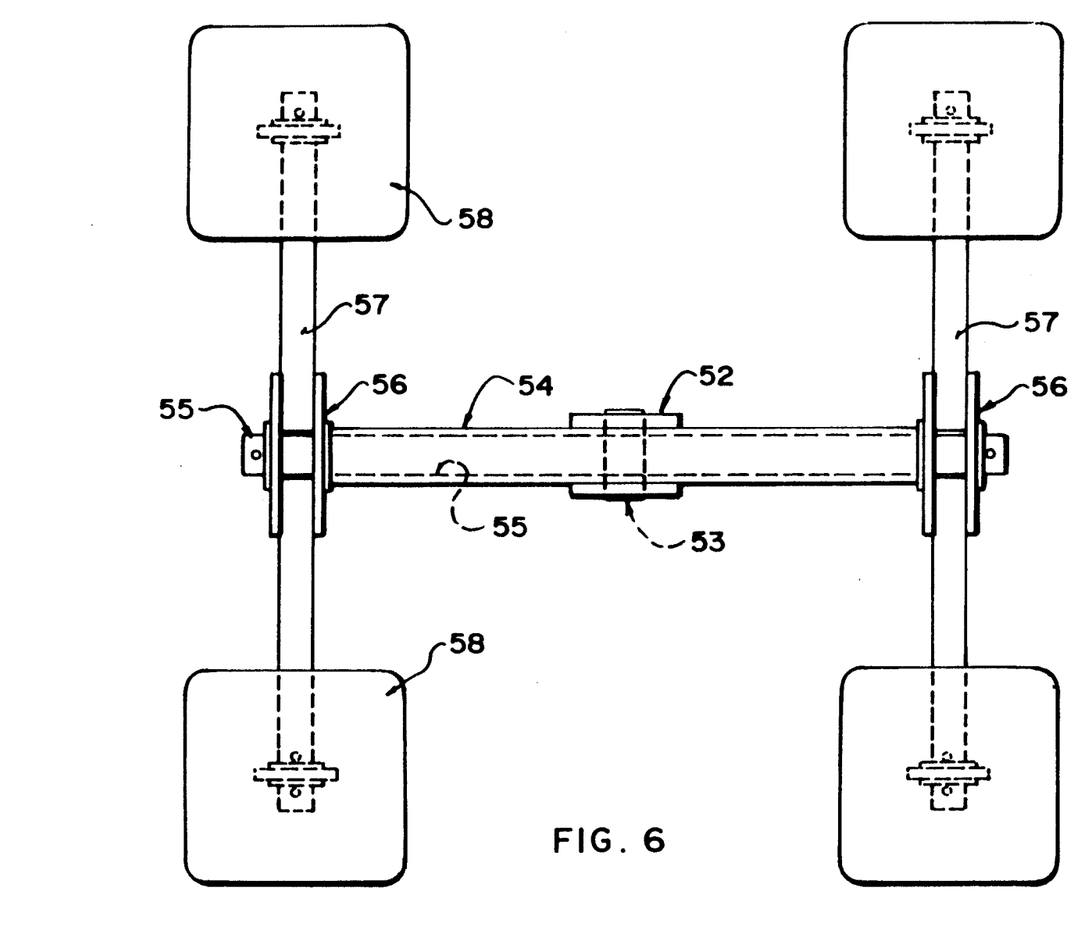
FIG. 6 is a top plan view of one of the roller assemblies of FIG. 1 on an enlarged scale.

The structure of each of the roller assemblies is shown in FIGS. 4, 5 and 6. Thus each roller assembly comprises a support bracket 41 having a base web 42 bolted or welded to the respective cross beam. The bracket includes two forwardly extending sides 43 and 44 defining a support for a transverse pin 45 carrying a cranked lever 46 for pivotal movement about the horizontal axis of the pin 45. The lever 46 includes a horizontal section 47 and a rearwardly and downwardly extending portion 48 which is carried within the area of the bracket to a position in which it can engage a lower edge of the web 42. The forward face of the lever 46 carries an eye bolt 49 for attachment to an actuating rod 50 with attached clevises.

The forward end of the lever 46 carries a clevis 52 pivotal about a pin 53 across the forward end of the lever. The clevis 52 carries a sleeve 54 extending generally parallel to the forward portion of the lever 46. The sleeve 54 receives an axle 55 extending therethrough so that the axle can swivel about the longitudinal axis of the sleeve 54. At each end of the axle 55 which emerges from the end of the sleeve 54 is provided a pivot coupling 56 which carries a transverse axle 57. Each of the axles 57 is thus pivotal about the longitudinal axis of the sleeve 54 independently of the other of the axles 57. At the end of each axle is mounted a wobble roller 58. Each of the rollers 58 can therefore rotate relative to its respective axle 57 and each of the axles can pivot about an axis at right angles to the axle 55 and in addition the transverse beam 54, 55 can pivot about the pin 53 which lies parallel to the axle 57. The rollers can thus pivot completely independently to follow the contour of the boat.

The roller assembly can be raised from a position shown in FIG. 4 to a lifted position by pulling on the actuating rod 50 in a direction toward the right as shown in FIG. 4 thus pivoting the lever about the pin 45 to raise the forward end of the lever and the rollers while the rollers remain in contact with the surface boat by pivotal movement of the of the roller assembly about the pin 53. This lifting movement is just sufficient to raise the rollers to a position in which the rollers engage the boat and lift it away from the bunks. As the rollers are positioned closer to the keel than the bunks, it is not necessary for the roller to be raised in height to a position above the height of the bunk but instead the lifting movement is controlled so that the movement is just sufficient to release the boat in the lowered position and to raise the boat away from the bunks in the raised position.

Figure 3:
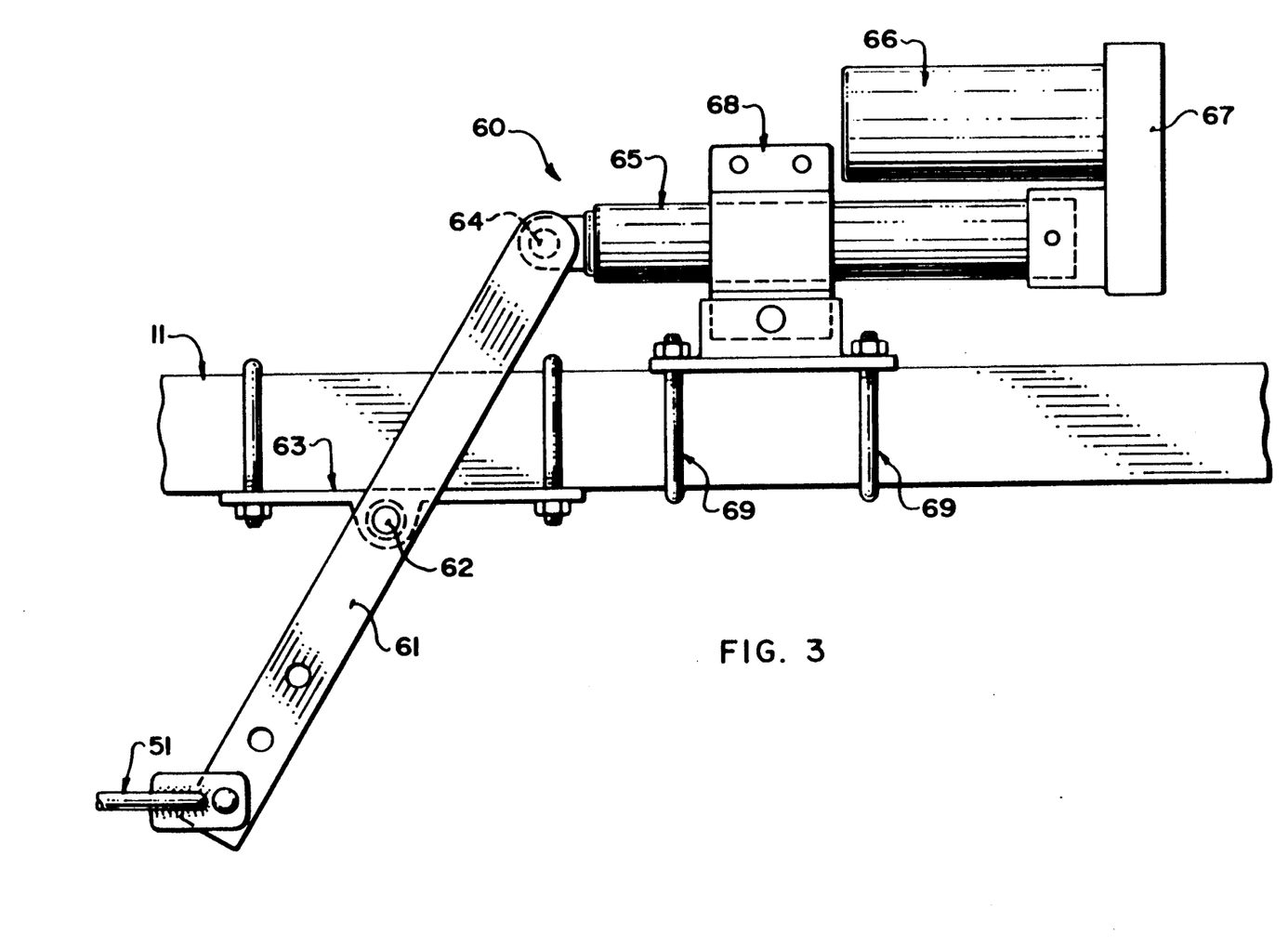
FIG. 3 is a side elevational view along the lines 3—3 of FIG. 1.

In the raised position, therefore, the boat can simply be rolled on and off the trailer by the rolling action against the keel rollers and against the roller assemblies. When the loading or unloading is complete, the roller assemblies can be lowered to the retracted position thus lowering the boat against the bunks for transportation. As show in FIG. 1, the rods 50 extend respectively from the roller assemblies 39 and 40 to the roller assemblies 37 and 38 respectively and directly connect by clevises to the eye bolts 49 of the front and rear roller assemblies. The rods 50 thus interconnect these roller assemblies for common actuation. A transverse link bar 50A extends across between the front roller assemblies and the rods 51 extend forwardly from the transverse link bar at the roller assemblies 37 and 38 to an actuating mechanism generally indicated at 60. The actuating mechanism 60 is shown in more detail in FIG. 3 and comprises a lever 61 mounted on a transverse pivot pin 62 carried on a bracket 63 bolted to the hitch bar 11 by conventional U bolts. The lever 61 includes two lever pieces each on a respective side of the hitch bar 11 and interconnected by a transverse top pin 64. Each of the rods 51 is attached to a respective one of the lever pieces so that counterclockwise movement of the lever acts to pull the rods 51 to cause actuation of the rollers that is the movement of the rollers from the lowered position to the raised position. Similarly movement in the clockwise direction causes a lowering action of the rollers. The movement of the lever is obtained by a linear actuator preferably of the screw type indicated at 65 which acts upon the pin 64. The screw type linear actuator is driven by a motor 66 through a transmission arrangement 67. The linear actuator and motor are mounted upon a bracket 68 again attached to the hitch bar 11 by U bolts 69.

As shown in FIGS. 1 and 2, immediately forwardly of the actuator mechanism 60 is provided a conventional winch tower 70 again mounted upon the hitch bar 11 by U clamps and comprising an upwardly and forwardly extending beam on which is mounted a winch 71 and a forward abutment member 72 for engaging the front part of the keel of the boat when fully winched to the forward position.

Between the winch tower and the hitch coupling 12 is provided a security and support system generally indicated at 73. This arrangement is shown in more detail in FIG. 7 and is shown in the retracted position in FIG. 2 and in the deployed position in FIG. 7. The security and support system therefore comprises a transverse plate 74 which is attached to the hitch bar 11 by U-bolt 75 or by welding so that the plate 74 is permanently attached to the hitch bar and cannot be readily removed. For this purpose if it is applied by the U bolt system, the nuts are welded or otherwise fixed so that the plate cannot be readily removed. Onto the plate is attached a channel member 76 which extends vertically downwardly and includes a front web 77 and a pair of rearwardly extending sides 78. Across the sides is mounted a pivot pin 79 upon which is mounted a single vertical leg 80. This leg 80 can pivot on the pin 79 from the erected position shown in FIG. 7 in which it lies along the axis of the channel 76 to a retracted position shown in FIGS. 1 and 2 in which it lies along the underside of the hitch bar 11. A retaining bracket 81 is mounted on the underside of the hitch bar 11 by U Bolt 82 and comprises simply a clevis with a transverse opening 82A to allow an attached pin to pass on the underside of the leg when received within the clevis to hold the leg in position in the retracted location along the underside of the hitch bar. At a lower end of the leg 80 is provided a ground engaging foot 83 in the form of a simple transverse tube extending at right angles to the length of the leg and across the width of the hitch bar. The foot includes a stub shaft 84 which projects into a hollow interior of the tubular leg 80 and is retained thereon by a shear pin 85 at the lower end of the leg. In the event that the leg should be left down during transportation, therefore, should the transverse tube 83 forming the foot engage an obstacle, the foot will be torn away by fracture of the shear pin rather than causing damage to the main structure of the device. In which case the leg can simply scrape across the ground trailing behind the hitch without further damage.

Figure 7:
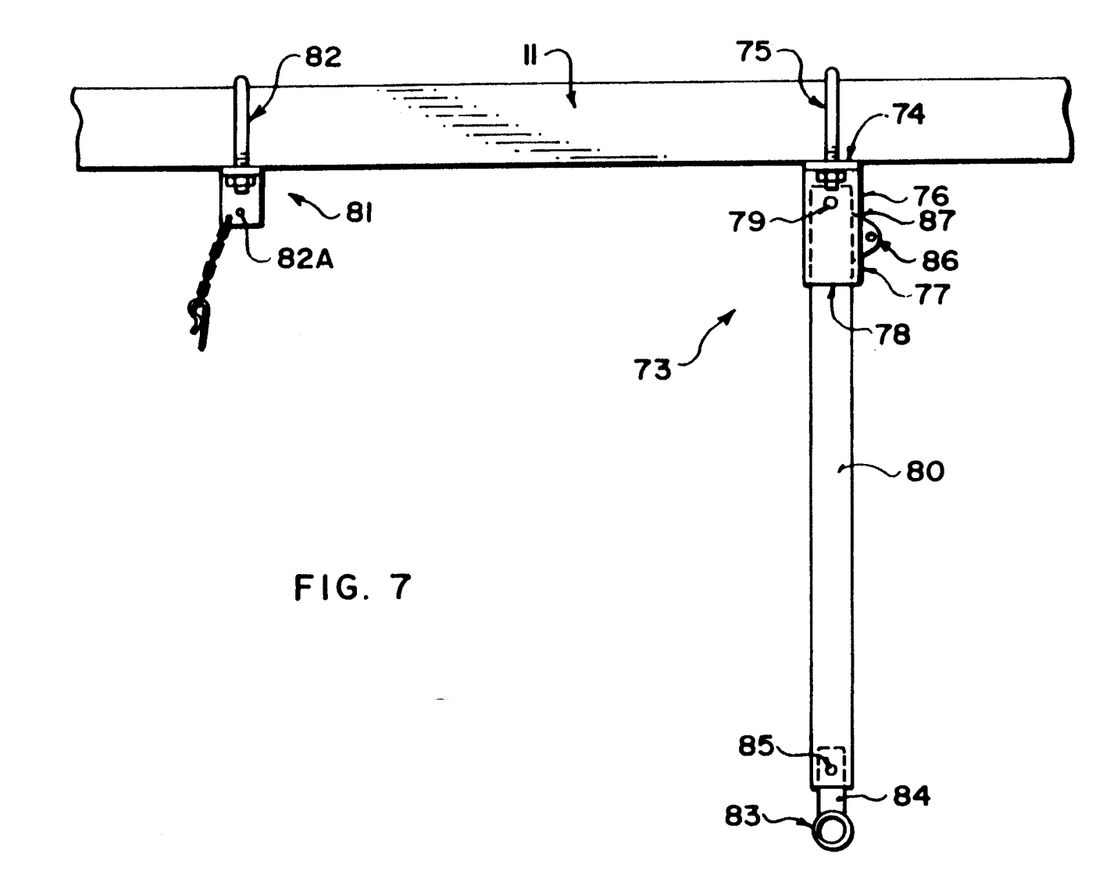
FIG. 7 is a side elevational view of one part of the boat trailer of FIG. 1 showing the security leg system in the deployed position, on an enlarged scale.

The length of the leg 80 is such that the hitch bar 11 is raised slightly to a position above the normal hitch height so that it is inclined upwardly as shown in FIG. 7. In order to move the leg to the erected or deployed position, therefore, it is necessary to raise the hitch and lower the leg to a position within the channel 76. In this position with the leg deployed the hitch can no longer be used since the hitch is raised above its normal position. Furthermore if the boat remains on the trailer, the boat is inclined slightly rearwardly so as to cause water to flow rearwardly to the normal discharge openings to prevent excess water being received and retained within the boat. The leg when moved to the deployed position is locked in place by an ear 86 which projects through a slot 87 in the web 77 of the channel. The ear 86 includes a transverse hole which can receive a lock, (not shown).

Since various modifications can be made in my invention as hereinabove described, and many apparently widely different embodiments of same made within the spirit and scope of the claims without departing from such spirit and scope, it is intended that all matter contained in the accompanying specification shall be interpreted as illustrative only and not in a limiting sense.

I claim:

1. A boat trailer comprising a trailer frame, hitch bar attached to the frame and extending forwardly therefrom, a ground wheel and suspension assembly attached to the frame for support thereof in movement across the ground, and support means for supporting a boat on the trailer frame for transportation and for loading onto and unloading from the trailer frame, the support means comprising bunk means comprising two parallel longitudinally extending, elongate, fixed support beams each arranged to extend along a respective side of the boat and having an upwardly facing surface for engaging the boat along a length thereof for providing a relatively large support area in engagement with the boat for transportation of the boat without stress points against the surface of the boat and four separate sets of roller means mounted at spaced positions across the trailer frame for engaging the boat for rolling on the roller means during loading and unloading, two sets being mounted at longitudinally spaced positions on one side of a center line of the boat and two sets being mounted at longitudinally spaced positions on an opposite side of the center line, four separate lever support members each separately mounted on the frame for pivotal movement relative thereto, each set being mounted on a respective one of the lever support members such that pivotal movement of the respective lever support member relative to the frame causes lifting of the respective set to increase the vertical height thereof such that said fours sets of roller means are raisable and lowerable to vary the relative height thereof whereby the bunk means engages the boat during transportation and the roller means lifts the boat away from engagement with he bunk means during loading and unloading, a winch mounted on the frame for pulling the boat longitudinally of the frame, and actuating means separate from the winch at a front of the trailer for simultaneously operating each of said lever support members for simultaneously raising said four sets of roller means.

2. The boat trailer according to claim 1 including a plurality of keel rollers mounted along a centre line of the trailer at spaced positions with each roller being rotatable about an axis transverse to the centre line.

3. The boat trailer according to claim 1 including a security leg system mounted on the hitch bar comprising a single elongate strut, bracket means mounting one end of the strut on the hitch bar for pivotal movement about an axis transverse to the hitch bar from a first position lying along an underside of the hitch bar to a second position extending substantially vertically downwardly from the hitch bar, a ground engaging foot on an opposed end of the strut for resting upon the ground in the second position of the strut to support the forward end of the hitch bar raised from the ground, the length of the strut being such that the forward end of the hitch bar is raised above a normal hitch height, and means for locking the strut in the second position.

4. The boat trailer according to claim 3 wherein the bracket means comprises a channel member attached to the hitch bar such that a longitudinal axis of the channel member extends vertically downwardly and an open face of the channel member extends rearwardly, the strut being mounted on a pin extending across the channel member such that in a second position of the strut the strut lies within the channel member extending longitudinally thereof and in the first position the strut extends from the channel member rearwardly along the underside of the hitch bar.

5. The boat trailer according to claim 4 wherein the locking means includes an ear mounted on a front face of the strut which projects in the second position through a slot in the bracket, the ear including an opening therein through which a lock can be placed.

6. The boat trailer according to claim 3 wherein the foot comprises a transverse tube.

7. The boat trailer according to claim 3 wherein the foot is separate from the strut and is attached thereto by a shear pin such that the foot can be broken away in the event that the foot engages an object during transportation of the trailer.

8. The boat trailer according to claim 3 including a retaining bracket mounted on the hitch bar at a position rearwardly of said bracket means for engaging and retaining the strut in the first position thereof.

9. A trailer comprising a trailer frame, hitch bar attached to the frame and extending forwardly therefrom, a ground wheel and suspension assembly attached to the frame for support thereof in movement across the ground, and support means for supporting an object on the trailer frame for transportation and for loading onto and unloading from the trailer frame, and a security leg system mounted on the hitch bar comprising a single elongate strut, bracket means mounting one end of the strut on the hitch bar for pivotal movement about an axis transverse to the hitch bar from a first position lying along an underside of the hitch bar to a second position extending substantially vertically downwardly from the hitch bar, a ground engaging foot on an opposed end of the strut for resting upon the ground in the second position of the strut to support the forward end of the hitch bar raised from the ground, the foot comprising a transverse tube and an attachment portion arranged to engage the strut at a single fixed position thereon, the strut consisting of a single integral elongate strut body extending from the bracket means to the foot, the length of the strut body being such that in the second position the forward end of the hitch bar is raised above a normal hitch height, wherein the bracket means comprises a channel member attached to the hitch bar such that a longitudinal axis of the channel member extends vertically downwardly with side walls of the channel member on respective sides of the strut, a front wall of the channel member forwardly of the strut and an open face of the channel member rearwardly of the strut, the strut being mounted on a pin extending across the side walls of the channel member such that in the second position of the strut the strut lies within the channel member extending longitudinally thereof and in the first position the strut extends from the channel member rearwardly along the underside of the hitch bar, and wherein the locking means includes an ear mounted on a front face of the strut which projects in the second position through a slot in the front wall of the channel member, the ear including an opening therein exposed forwardly of the front wall through which a lock can be placed.

10. The trailer according to claim 9 wherein the foot is attached to the strut by a shear pin such that the foot can be broken away in the event that the foot engages an object during transportation of the trailer.

* * * * *